(12) United States Patent
Okamura

(10) Patent No.: US 6,947,447 B1
(45) Date of Patent: Sep. 20, 2005

(54) IMAGE COMMUNICATION APPARATUS, IMAGE COMMUNICATION METHOD AND RECORDING MEDIUM WHICH STORES THE SOUND AND IMAGE

(75) Inventor: Shuichi Okamura, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/057,556

(22) Filed: Apr. 9, 1998

(30) Foreign Application Priority Data

May 15, 1997 (JP) .................................. 9-125514

(51) Int. Cl.⁷ .............................. H04J 3/16; H04N 7/06
(52) U.S. Cl. ...................... 370/470; 370/493; 386/98
(58) Field of Search ............................... 370/470, 493, 370/465, 471, 473, 474, 475, 394; 386/98; 714/719

(56) References Cited

U.S. PATENT DOCUMENTS

| | | | | |
|---|---|---|---|---|
| 4,785,349 A | * | 11/1988 | Keith et al. .................. | 348/390 |
| 5,375,068 A | * | 12/1994 | Palmer et al. ............... | 709/204 |
| 5,392,223 A | * | 2/1995 | Caci ............................ | 709/218 |
| 5,784,112 A | * | 7/1998 | Ogasawara et al. ....... | 348/423.1 |
| 5,838,383 A | * | 11/1998 | Chimoto et al. ............. | 348/553 |
| 5,889,921 A | * | 3/1999 | Sugiyama et al. ............ | 386/98 |
| 5,893,062 A | * | 4/1999 | Bhadkamkar et al. ...... | 704/270 |
| 5,949,792 A | * | 9/1999 | Yasuda et al. ............... | 370/474 |
| 5,956,729 A | * | 9/1999 | Goetz et al. ............. | 707/104.1 |
| 6,005,633 A | * | 12/1999 | Kosugi ....................... | 348/518 |
| 6,233,251 B1 | * | 5/2001 | Kurobe et al. .............. | 370/471 |

FOREIGN PATENT DOCUMENTS

EP    0806873 A2  *  12/1997

* cited by examiner

*Primary Examiner*—John Pezzlo
*Assistant Examiner*—Saba Tsegaye
(74) *Attorney, Agent, or Firm*—Fitzpatrick, Cella, Harper & Scinto

(57) ABSTRACT

An image communication apparatus includes a packet transmitting unit for transmitting image data or sound data in packets and a detecting unit for detecting the amount of sound data to be transmitted in packets. The apparatus also includes a control unit for switching the packet size of image data to be transmitted in packets by the packet transmitting unit, according to the result of detection performed by the detecting unit. Sound data accompanying image data is smoothly transferred to the receiving side in packet transmission of image data and sound data.

14 Claims, 6 Drawing Sheets

SOUND DATA

IMAGE DATA

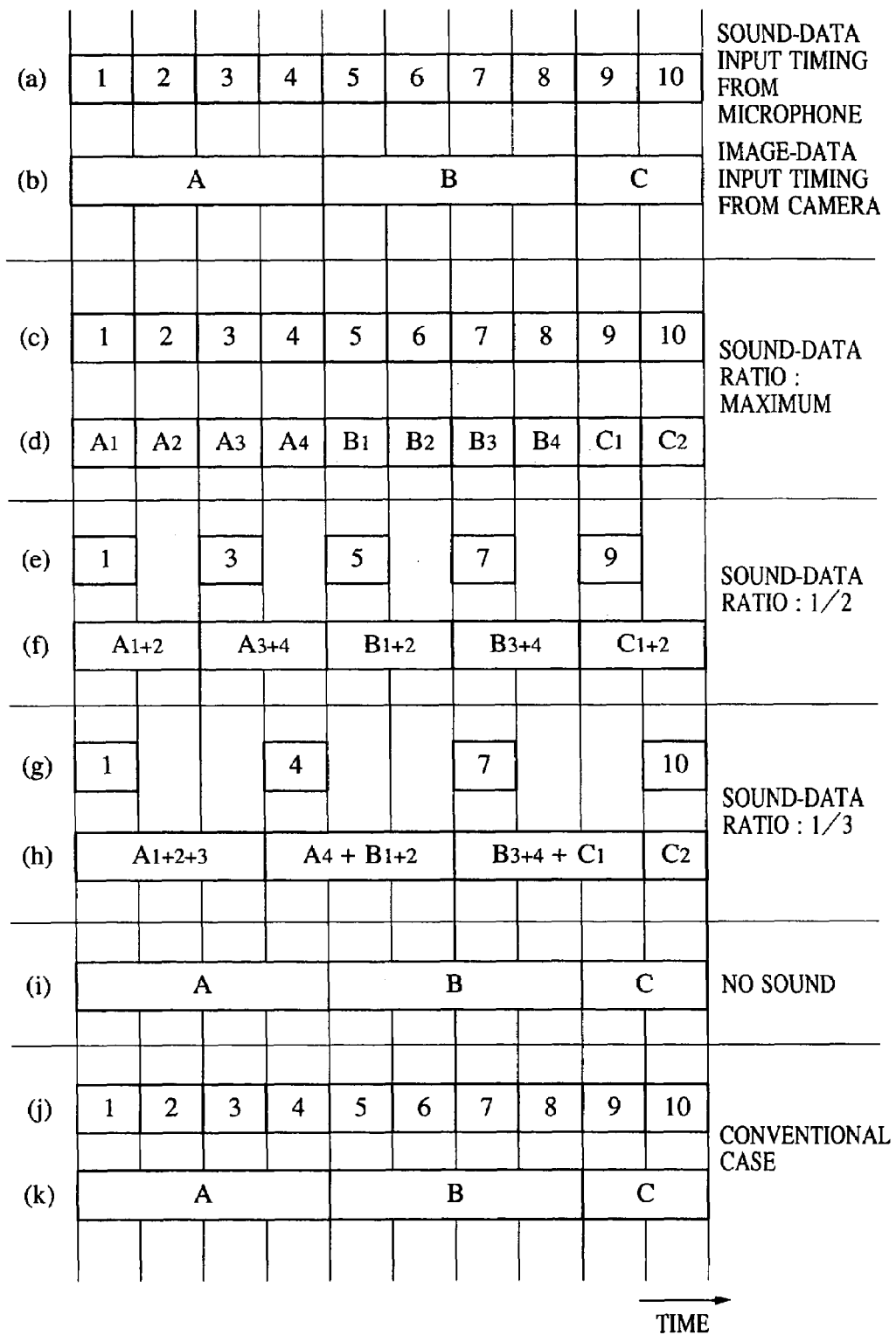

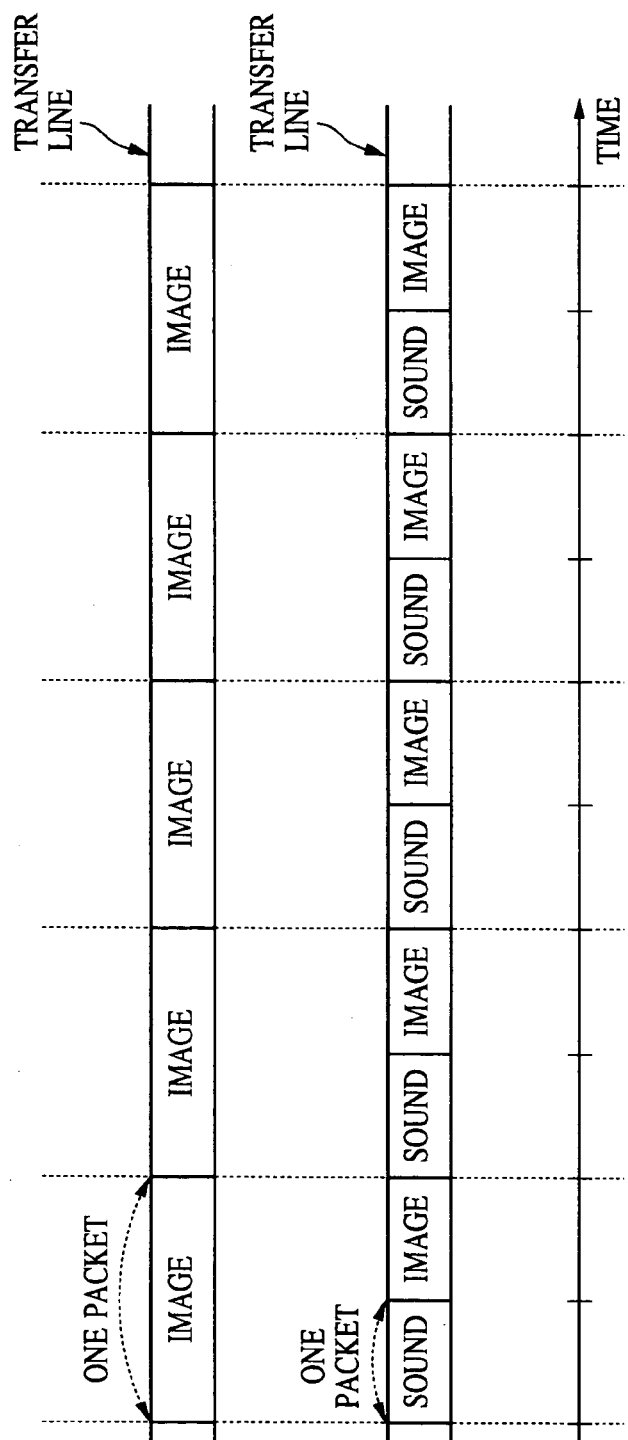

IMAGE COMMUNICATION APPARATUS, IMAGE COMMUNICATION METHOD AND RECORDING MEDIUM WHICH STORES THE SOUND AND IMAGE

BACKGROUND OF THE INVENTION

1. Field of the Invention

The present invention relates to an image communication apparatus and an image communication method in both of which communication is allowed with image data and sound data, and a recording medium which stores this method.

2. Description of the Related Art

In an application in which an image and sound are transmitted, such as video telephony, the image and sound are transmitted without coordinating packet sizes therefor.

In packet transmission of sound, a packet as small as possible is employed in order to reduce the feeling of delay at the receiving side by the time required for capturing and packeting sound and, if the sound data is compressed and transmitted, the time required for compression.

Since the start time and the end time of packet transmission shifts between the transmission side and the receiving side according to the time required for packet transmission, the user at the receiving side usually feels that the receiving timing of sound data is natural. The time periods described above such as that required for capturing sound need to be reduced as much as possible.

On the other hand, in packet transmission of an image, high-speed image transmission is enabled by dividing a captured image of one screen into packets as large as possible and transmitting them. Therefore, it is preferred that the packet size for an image be as large as possible.

As described above, image data and sound data have different natures in terms of packet size.

In applications such as video telephony, since the delay of sound is more conspicuous than that of an image at the receiving side, it is usual to give priority to sound data over image data in transmission. A function for not transmitting sound if its level is equal to or less than a threshold is usually provided because it is of no use to packet-transmit sound data without sound.

The upper limit of the size of a packet which can be transmitted is usually specified in packet transmission. This limit is called the maximum transfer unit (MTU) of a network. In the Ethernet, for example, MTU is set to 1500 bytes. Although the maximum packet size is not specified in the Internet, it is recommended that a packet data capable of being handled be 576 bytes in a network and gateway without fragmentation. Since a protocol header is added to data, the actual data size is less than 576 bytes. Such an actual upper limit of data size is assumed to be the maximum packet size.

In the conventional packet transmission in which an image and sound are transmitted with packet sizes suited thereto, if an image to be transmitted with a large packet size and sound to be transmitted with a small packet size are sequentially output to the same transfer line, the sound corresponding to a received image reaches the receiving side with a delay from the time the image was received. In serial transmission of image packets and sound packets, for example, since a sound packet cannot be transmitted until one image packet has been sent, even if a large amount of sound data is to be transmitted (namely, sound is continuously generated), the intervals between a plurality of sound packets, which express continuous data of sound, become large. As a result, a period in which sound is interrupted becomes very large.

SUMMARY OF THE INVENTION

Accordingly, it is an object of the present invention to transmit sound data accompanying image data smoothly to the receiving side in packet communication of image data and sound data.

More specifically, the object is to transmit image data and sound data with packet sizes suited as much as possible to the natures thereof and to transmit sound data which has been input at the same timing as the accompanying image data has been input, at a timing that is as near to the same as possible.

The foregoing object is achieved in one aspect of the present invention through the provision of a communication apparatus including: packet transmitting means for transmitting image data or sound data in packets; detecting means for detecting the amount of sound data to be transmitted in packets; and control means for switching the packet size of the image data to be transmitted in packets by the packet transmitting means, according to the result of detection performed by the detecting means.

The foregoing object is achieved in another aspect of the present invention through the provision of a communication method including: a packet transmitting step for selectively transmitting image data or sound data in packets; a detecting step for detecting the amount of sound data to be transferred in packets; and a control step for switching the packet size of the image data to be transferred in packets in the packet transmitting step, according to the result of detection in the detecting step.

The foregoing object is achieved in yet another aspect of the present invention through the provision of a recording medium storing in a readable state from a computer a program for having a communication apparatus implement steps including: a packet transmitting step for selectively transmitting image data or sound data in packets; a detecting step for detecting the amount of sound data to be transferred in packets; and a control step for switching the packet size of the image data to be transferred in packets in the packet transmitting step, according to the result of detection in the detecting step.

Other objects and features of the present invention will be clearly understood by the following descriptions of embodiments and the drawings.

BRIEF DESCRIPTION OF THE DRAWINGS

FIG. 3 is a chart illustrating transfer of image packets and sound packets.

FIGS. 5A and 5B form a chart illustrating transfer of image packets and sound packets.

DETAILED DESCRIPTION OF THE PREFERRED EMBODIMENTS

Figure 1:
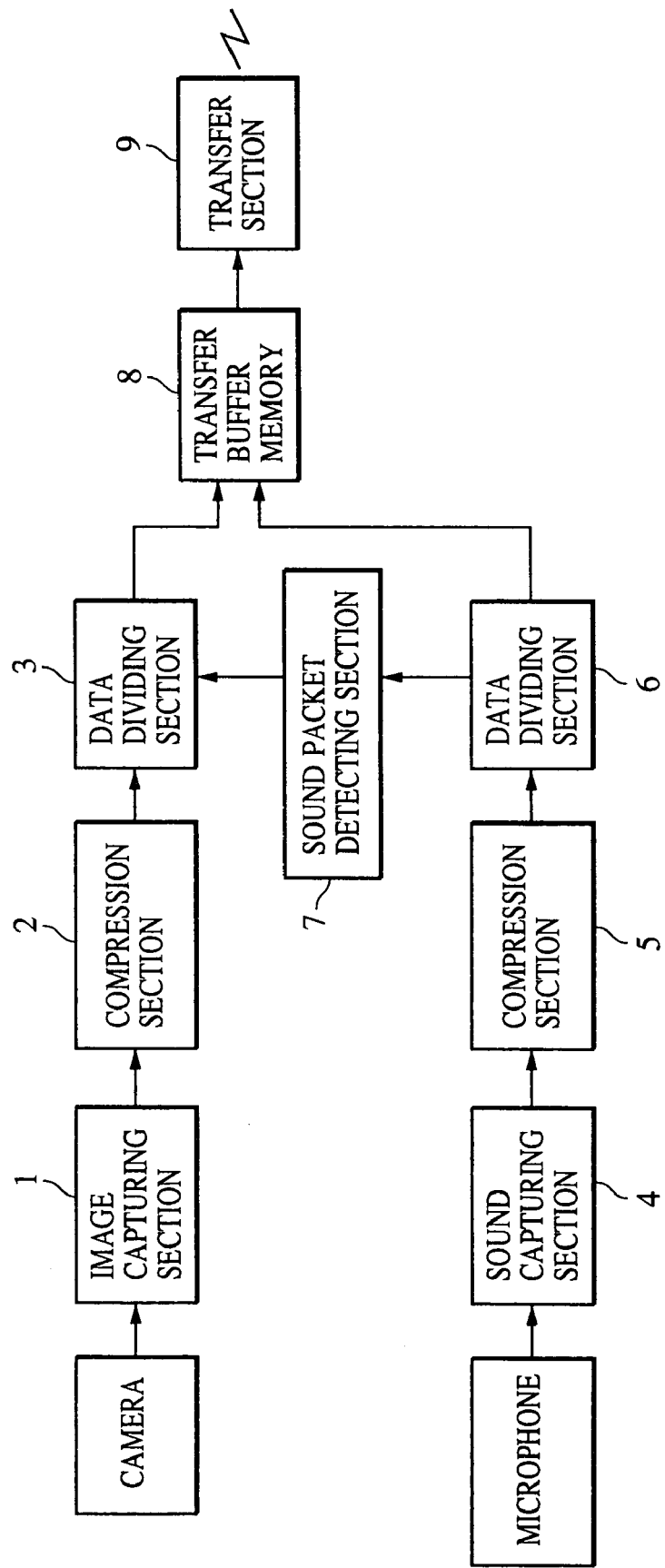
FIG. 1 is a block diagram of an image communication apparatus according to an embodiment of the present invention.

Embodiments of the present invention will be described below by referring to the drawings.

FIG. 1 is a block diagram of an image communication apparatus according to a first embodiment of the present invention. In FIG. 1, there is shown an image capturing section 1 for capturing image data input through a motion-picture camera or a still-picture camera, a compression section 2 for compressing the image data sent from the image capturing section 1 and outputting it, and a data dividing section 3 for dividing a series of compressed image data in units of specified data amounts to sequentially generate a plurality of image packets.

There is also shown a sound capturing section 4 for capturing sound data input through a microphone, a compression section 5 for compressing the sound data sent from the sound capturing section 4, and a data dividing section 6 for dividing a series of compressed sound data in units of specified data amounts to generate a plurality of image packets.

There is further shown a sound packet detecting section 7 for detecting sound data sent to the data dividing section 6 or a sound packet generated thereafter and for outputting a control signal to the data dividing section 3 according to the result of this detection, a transfer buffer memory 8 for temporarily storing an image packet and a sound packet, and a transfer section 9 for sequentially transmitting (packet transmitting) in radio each image packet or each sound packet stored in the transfer buffer memory 8, in a transmission order described later to an available transfer-destination terminal.

The present invention is not limited to radio transmission. It can also be applied to packet transmission with a telephone line being directly connected and to packet transmission with a special network line being directly connected.

Image data is captured by the image capturing section 1 and sound data is captured by the sound capturing section 4 in synchronization with the image and sound input through the camera and microphone, and they are output to each compression section. Therefore, an image packet and a sound packet are input to the transfer buffer memory at almost the same timing as when the image and sound are actually input.

An operation of the apparatus shown in FIG. 1 is described below.

The image data captured by the image capturing section 1 is compressed by the compression section 2 and sent to the data dividing section 3. The data dividing section 3 generates image packets having the most appropriate sizes (size variable) from the image data according to a control signal sent from the sound packet detecting section 7, and outputs them to the transfer buffer memory 8. The way in which the data dividing section 3 operates together with the sound packet detecting section 7 will be described in detail later.

The sound data captured by the sound capturing section 4 is compressed by the compression section 5 and sent to the data dividing section 6. The data dividing section 6 generates sound packets having a size specified in advance from the input sound data, and sequentially outputs them to the transfer buffer memory 8.

The relationship between the sound packet detecting section 7 and the data dividing section 3 will be described next. The sound packet detecting section 7 detects at a certain interval sound data input to the data dividing section 6 or a sound packet to be output. When it is determined as the result of detection that sound data or a sound packet exists, the sound packet detecting section 7 outputs a control signal to the data dividing section 3 to sequentially divide the image packets with the same size as that of the sound packets. Conversely, if it is determined that sound data or a sound packet does not exist, the sound packet detecting section 7 outputs a control signal to the data dividing section 3 to sequentially divide the image packets with a size larger than that of the sound packets.

The control signal is output in real time according to a condition of whether the data dividing section 6 has sound data or a sound packet.

When the data dividing section 3 receives the control signal, the section switches in real time the size with which input image data is divided.

As described above, image packets and sound packets with the controlled packet sizes are input to and stored in the transfer buffer memory 8.

The transfer section 9 sequentially transmits in radio image packets and sound packets input to the transfer buffer memory 8 in the order in which they have been input, to the destination. In other words, the transfer section 9 outputs image packets and sound packets not necessarily alternately. The section sends image packets frequently if the number of input sound packets is small.

Figure 2B:
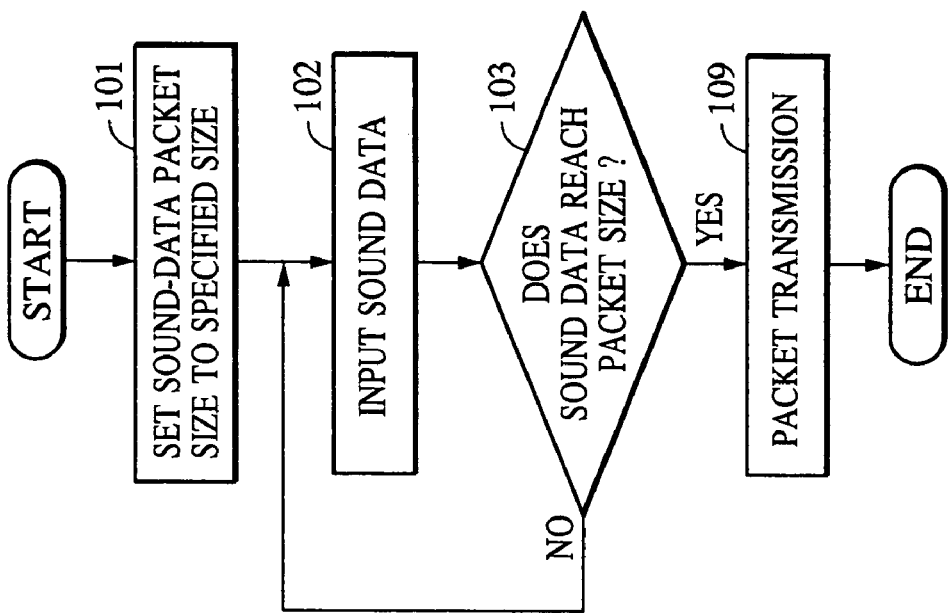
FIGS. 2A and 2B illustrate a flowchart indicating an operational procedure of the image communication apparatus.
Figure 2A:
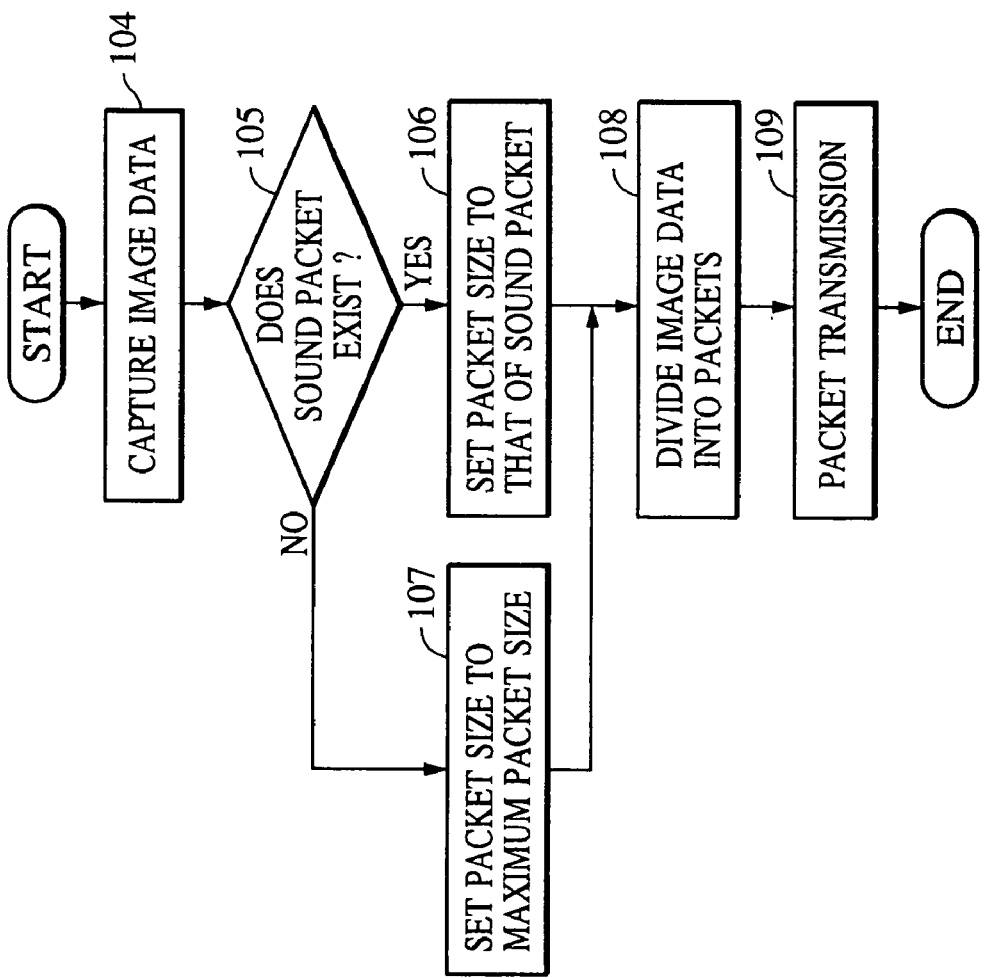

FIGS. 2A and 2B show an image communication method, which is an operation flow of the image communication apparatus according to the present embodiment.

In FIG. 2B, a procedure (b) including steps 101, 102, 103, and 109 is applied to sound-data processing, and in FIG. 2A, a procedure (a) including steps 104, 105, 106, 107, 108, and 109 is applied to image-data processing. The periods of the operations in these procedures for handling sound data and image data are short so that synchronization between an image and sound accompanying the image is not lost.

The procedure (b) will be described first. In FIG. 2B, a size used in the data dividing section 6 for sound is set to a certain size smaller than the maximum packet size (step 101). This operation is performed to prevent real-time reproduction of sound from being lost at the communication destination due to a large packet size of sound. Sequentially captured sound data is input (step 102), and divided in the specified sound-packet size (step 103). During division in step 103, it is determined whether input sound data reaches the packet size. When it reaches the size, the sound data is output to the transfer buffer memory 8 and the transfer section 9 as a sound packet and it is transmitted in radio in the specified network protocol by the transfer section 9 (step 109).

For as long as the input sound data does not reach the sound-packet size, the above operation is repeated until the data reaches the size.

The procedure (a) will be described next. In FIG. 2A, image data of one frame (one screen) is captured (step 104). Then, it is determined whether sound data from which a packet is being generated or a generated sound packet exists (step 105).

In step 105, when the sound data or the generated sound packet exists, the size used for dividing the captured image data into packets is set to the size specified in advance for the sound packet (step 106).

If the sound data or the generated sound packet does not exist, the image packet size is set to the maximum size which the network protocol allows in radio transmission (step 107).

The captured one-frame image data is divided in the packet size specified in step 106 or 107 (step 108).

The packets divided into are output to the transfer buffer memory 8 and the transfer section 9, and are transmitted in radio from the transfer section 9 in the specified network protocol (step 109).

The network protocol employed is, for example, TCP/IP or UDP. The protocol is not limited to this protocol. Other network protocols may be used in the present invention.

The way in which the image and sound communication described above is performed will be described next by referring to FIG. 3.

In FIG. 3, line (a) indicates the timing at which sound is sent from the microphone. Blocks 1 to 10 show certain units of sound data sent from the microphone. Line (b) indicates the timing at which an image is sent from the camera. Blocks A, B, and C show certain units of images, such as frames of images.

Lines (a) and (b) in FIG. 3 show that one unit of image is input when four units of sound are input. This means that when one unit of image is transmitted correspondingly to four units of sound in synchronous transmission of image and sound, the sound accompanying the image can be transmitted at nearly the same timing as the image. As a result, the image and the sound are reproduced at nearly the same timing at the receiving side.

It is assumed that the maximum packet size in the network protocol is equal to four sections divided by vertical lines in the figure. An image or sound is not transferred in a packet size over the maximum size.

In the following description, it is assumed that an image is always input and it is input in real time at a fixed timing. The microphone or the sound capturing section 4 is controlled such that sound is input only when it reaches a certain amount. In other words, only the amount of input sound changes in the following description.

In FIG. 3, lines (c) and (d) show how image and sound packets are generated when sound is frequently input.

In line (c), since sound is most frequently input, control is performed such that the size (a small size determined in advance) of a sound packet is equal to that of an image packet, and images and sound are sequentially transmitted in radio. Specifically, block 1, which is a sound packet, is transmitted and then block $A_1$, which is an image packet, is sent. Transmission is performed in the order of block 2, block $A_2$, block 3, block $A_3$, block 4, block $A_4$, and so on. The user at the communication destination does not feel that sound is delayed against the corresponding image. Smooth image and sound communication is implemented. The packet division manner shown in FIG. 3, lines (c) and (d) can be applied to a packet division method used in the data dividing section 3 for a case in which a control signal is output when it is determined that a sound packet exists as shown in FIG. 1. The manner can also be applied to a control method used in steps 106 and 108 shown in FIG. 2A.

In FIG. 3, lines (e) and (f) show a case in which the amount of input sound is half that of input image data.

In this case, the image packet is not set to the maximum size but set to half the maximum size, and image packets are generated. Data is transmitted in the order of a sound packet 1, an image packet $A_{1+2}$, a sound packet 3, an image packet $A_{3+4}$, a sound packet 5, an image packet $B_{1+2}$, a sound packet 7, an image packet $B_{3+4}$, and so on. Image and sound communication suited to the current ratio of the amount of image data to that of sound data is implemented. The user does not feel that sound is delayed against the corresponding image.

Although the way in which the packet size is controlled is not described above, it can be implemented with a modification of the sound packet detecting section 7 and the data dividing section 3 in FIG. 1 or with an additional branch which is the same as that in steps 106 and 107 in FIG. 2A.

In FIG. 3, lines (g) and (h) show a case in which the amount of input sound is one third that of input image data.

In this case, the image packet is not set to the maximum size but set to one third the maximum size, and image packets are generated. Data is transmitted in the order of a sound packet 1, an image packet $A_{1+2+3}$, a sound packet 4, an image packet $A_4+B_{1+2}$, a sound packet 7, an image packet $B_{3+4}+C_1$, a sound packet 10, an image packet $C_{2+3+4}$, and so on. Image and sound communication suited to the current ratio of the amount of image data to that of sound data is implemented. The user does not feel that sound is delayed against the corresponding image.

Although the way in which the packet size is controlled is not described above, it can be implemented with a modification of the sound packet detecting section 7 and the data dividing section 3 in FIG. 1 or with an additional branch which is the same as that in steps 106 and 107 in FIG. 2A.

Line (i) of FIG. 3 shows a case in which images are input but sound is not input.

In this case, the image packet size is set to the maximum size (four blocks) allowed in the network protocol and image packets are generated. Data is transmitted in the order of an image packet A, an image packet B, an image packet C, and so on. Communication best suited to images is implemented.

In a conventional case, control is performed as shown in FIG. 3, lines (j) and (k), unlike that shown in lines (c) and (d). Since images are divided into packets irrespective of the ratio of the amount of image to that of sound, the user at the destination feels that sound is delayed against the corresponding image.

The present embodiment is applied to an image communication apparatus in which image and sound are transmitted with a camera for motion pictures or still pictures serving as an image input section and a microphone serving as a sound input section as shown in FIG. 1. It is preferred that the embodiment be applied to an image communication apparatus also providing a receiving operation corresponding to the above described transmission operation with a receiving section having the same receiving function as the transfer section 9, a memory having the same function as the transfer buffer memory 8, a reproduction section for expanding received image data and sound data according to their packet dividing methods and compression methods to reproduce the original image data and sound data, and a liquid crystal display and a speaker for outputting the image data and sound data.

Figure 4A:
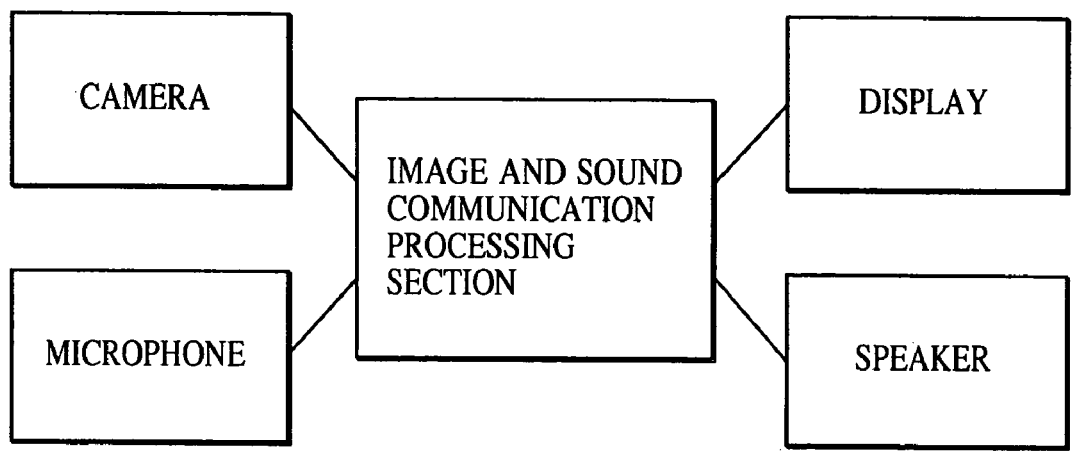
FIG. 4A is a block diagram of a communication apparatus having a typical configuration according to the present invention.

The present invention can be applied to a system in which sections having functions required for the above transmission and receiving operations are connected to each other with communication lines, as shown in FIG. 4A. The present invention can also be applied to a single apparatus having the above sections within its cabinet, as shown in FIG. 4B.

Figure 4B:
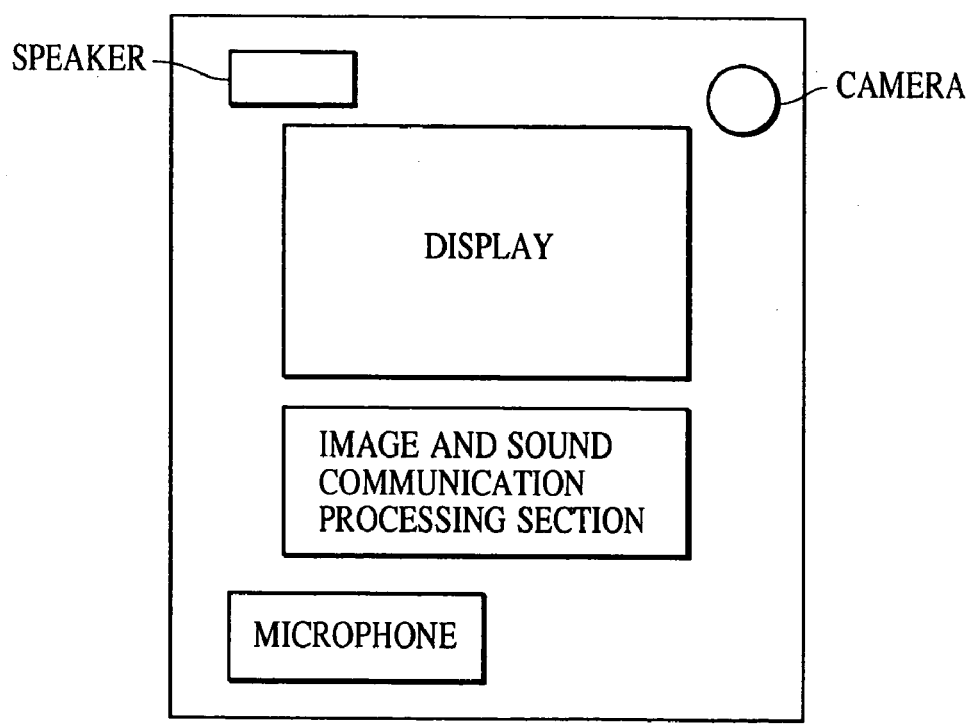
FIG. 4B is a diagrammatic view of a communication apparatus in a cabinet according to the present invention.

An image and sound communication processing section shown in FIGS. 4A and 4B includes an image and sound capturing function, a compression and expansion function, a packet dividing function, a buffering function, and a communication function among the functions described above.

According to the present embodiment described above, since the image packet size is changed depending on whether a sound packet is transmitted and on the (input or transmission) ratio of the amount of images to that of sound, image and sound communication most suited to each case can be implemented. Smooth image and sound communication is implemented without giving the user at the destination a feeling of delay of sound against the corresponding image. Therefore, image and sound communication is implemented in real time.

A video telephone system which includes application software for controlling image transfer (hereinafter called an image transfer application) and application software for controlling sound transfer (hereinafter called a sound transfer application), each of which is independent from each other, according to a second embodiment of the present invention will be described below.

The video telephone system according to the present embodiment can be applied to a system having a motion-picture or still-picture camera serving as an image input section, a microphone serving as a sound input section, a liquid crystal display serving as an image output section, and a speaker serving as a sound output section. These sections may be connected to each other with communication lines or may be accommodated into one cabinet.

The image transfer application detects the operation condition of the sound transfer application as one of the following conditions.

Condition 1: The sound transfer application is not activated.

Condition 2: The sound transfer application has been activated but sound is not being transferred (a sound packet does not exist).

Condition 3: The sound transfer application has been activated and sound is being transferred (a sound packet exists).

In the present embodiment, condition 2 applies to a case in which a function for not transferring a packet when sound data in the packet does not reach a certain sound-level threshold operates in order to eliminate wasteful transfer of a no-sound packet. Condition 2 can also be applied to a case in which the user (either at the transmitting side or the receiving side) specifies image transfer only in a video telephone system (the sound transfer application) and the sound transfer application temporarily stops sound capturing.

The way in which image data and sound data are transferred in the foregoing three conditions will be described below by referring to FIGS. 5A and 5B.

FIGS. 5A and 5B show a case in which image data and sound data are transferred in the form of packets through a transfer line.

The image transfer application monitors the operation condition of the sound transfer application at a certain interval during image transfer.

When condition 1 is detected as the result of monitoring, the image transfer application divides input image data in the maximum packet size allowed in the network protocol and sequentially transfers them through the transfer line, as shown in FIG. 5A.

When condition 2 is detected as the result of monitoring, the image transfer application divides input image data in the maximum packet size allowed in the network protocol and sequentially transfers them through the transfer line. At the same time, the image transfer application always checks if a sound packet exists. When a sound packet to be transferred is detected, the condition changes to condition 3.

When condition 3 is detected as the result of monitoring, the image transfer application divides input image data in the same packet size as that for sound data and sequentially transfers them through the transfer line. FIG. 5B shows such transfer.

Image data is divided into packets in each frame and transferred. Assuming that image data in one frame has 1400 bytes, for example, and the maximum packet size for image transfer is 512 bytes, three packets (1400/512=2.734375) are required in the frame. Therefore, the last (third) packet size is set to 376 (1400−512*2) bytes, which is smaller than 512 bytes.

Figures 6A, 6B:
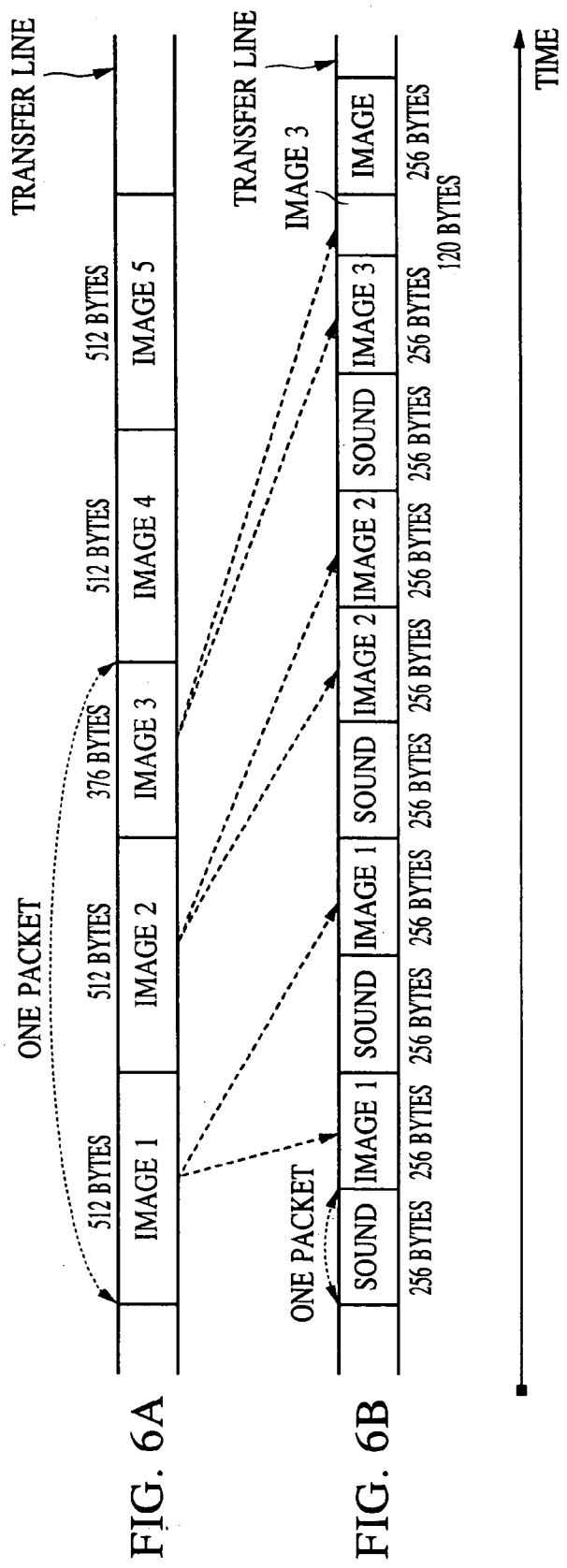
FIGS. 6A and 6B form a chart illustrating transfer of image packets and sound packets with specific sizes.

FIG. 6A shows packet sizes used in condition 1 and condition 2 (when only image packets are transmitted). The first frame has image 1, image 2, and image 3.

When a sound packet to be transferred (in a packet size of 256 bytes) through the transfer line exists as in condition 3, image data in one frame is divided to a packet size of 256 bytes and transferred.

This condition is specifically illustrated in FIG. 6B. Since six packets are required in one frame (1400/256= 5.46875), the last (sixth) packet in a frame has 120 bytes (1400−256*5).

As in the first embodiment, when the image transfer application and the sound transfer application are provided not only with an image and sound transmitting function but also with the image and sound receiving function corresponding thereto, a video telephone system allowing transmission and receiving can be implemented.

In the present embodiment, the image transfer application and the sound transfer application are independent from each other. The present invention can also be applied to a single application which controls the transfer of both image and sound.

Also in the video telephone system having the image transfer application and the sound transfer application, since the image packet size is changed depending on whether a sound packet is transmitted or depending on the (input or transmission) ratio of the amount of images to that of sound, image and sound communication most suited to each case can be implemented. Smooth image and sound communication is implemented without giving the user at the destination a feeling of delay of sound against the corresponding image.

In the first embodiment, the packet size for image data is set to the same as that of sound data when the ratio of the amount of sound data to be transferred in packets to that of image data is the maximum (corresponding to FIG. 3, lines (c) and (d)). The packet size is not limited to this size. The packet size of sound data is not necessarily required to be the same as that of image data when the packet size of the image data decreases as the ratio of the amount of the sound data to that of the image data increases.

The present invention may be applied to a part of a system having a plurality of units or to a part of an apparatus having only one unit.

The present invention is not limited to an apparatus or a method for implementing the above embodiments. The present invention also includes a case in which software program codes which implement each of the above embodiments are supplied to the computer (CPU or MPU) of the above system or the apparatus and the system or the apparatus operates each device to implement the above embodiments according to the program codes.

In this case, since the software program codes themselves implement the functions of the above embodiments, the present invention includes the program codes themselves and means for supplying the program codes to a computer, that is, a recording medium which stores the program codes.

Recording media which store such program codes include a floppy disk, a hard disk, an optical disk, a magneto-optical disk, a CD-ROM, a magnetic tape, a nonvolatile memory card, and a ROM.

The present invention includes not only a case in which the computer controls each device only according to the supplied program codes to implement the functions of the above embodiments but also a case in which the program codes cooperate with the operating system or other application software running on the computer to implement the above embodiments.

The present invention also includes a case in which the supplied program codes are stored in memory provided for a function extension board of the computer or a function extension unit connected to the computer, and the CPU provided for the function extension board or the function extension unit performs a part or the whole of actual processing according to the instructions of the program codes to implement the above embodiments.

As described above, according to the present invention, since packet transmitting means for transmitting image data or sound data in packets, detecting means for detecting the amount of sound data to be transmitted in packets, and control means for switching the packet size of image data to be transmitted in packets by the packet transmitting means, according to the result of detection performed by the detecting means are provided, sound data accompanying image data can be transmitted smoothly to the receiving side in packet transmission of image data and sound data. Specifically, image data and sound data are transmitted with packet sizes suited as much as possible to their natures, and sound data input at the same timing as the corresponding input image data is transmitted at a timing as near to the same as possible as that for the image data.

The present invention can be modified in various ways in its scope.

What is claimed is:

1. A communication apparatus that performs data communication via a communication network, said apparatus comprising:
   a packet transmitter adapted to transmit image data in packets and to transmit sound data in packets, wherein the sound data is divided into packets of invariable packet size and the image data is divided into packets of variable packet size;
   a detector adapted to detect an interval of sound data to be transmitted in packets; and
   a controller adapted to decrease the variable packet size of the packets of image data to be transmitted, in proportion to a decrease in the interval of sound data to be.

2. A communication apparatus according to claim 1, wherein said controller changes the packet size of the image data gradationally according to the interval of the sound data to be transmitted in packets.

3. A communication apparatus according to claim 1, further comprising an image input unit for inputting the image data by photographing an image.

4. A communication apparatus according to claim 3, wherein said image input unit includes one of a motion-picture camera and a still-picture camera.

5. A communication apparatus according to claim 1, further comprising a sound input unit for inputting the sound data.

6. A communication apparatus according to claim 5, wherein said sound input unit includes a microphone.

7. A communication apparatus according to claim 1, further comprising a compression unit for compressing at least one of the image data and the sound data.

8. A communication apparatus according to claim 1, further comprising:
   a receiver for receiving image data and sound data transferred in packets; and
   a player unit for playing the image data and the sound data received by said receiver.

9. A communication apparatus according to claim 8, wherein said player unit includes an expansion unit for expanding the received image data and the received sound data.

10. A communication apparatus according to claim 8, wherein said player unit includes a display for visibly displaying an image corresponding to the received image data.

11. A communication apparatus according to claim 8, wherein said player unit includes a speaker for outputting sound corresponding to the received sound data.

12. A communication method of performing data communication via communication network; said method comprising:
   a packet transmission step of transmitting image data in packets and transmitting sound data in packets, wherein the sound data is divided into packets of invariable packet size and the image data is divided into packets of variable packet size;
   a detection step of detecting an interval of sound data to be transmitted in packets; and
   a control step of decreasing the variable packet size of the packets of image data to be transmitted, in proportion to a decrease in the interval of sound data to be transmitted in packets, as detected in said detection step.

13. A computer-readable recording medium storing a program for performing data communication via a communication network, the program comprising:
   program code for a packet transmission step of transmitting image data in packets and transmitting sound data in packets, wherein the sound data is divided into packets of invariable packet size and the image data is divided into packets of variable packet size;
   program code for a detection step of detecting an interval of sound data to be transmitted in packets; and
   program code for a control step of decreasing the variable packet size of the packets of image data to be transmitted, in proportion to a decrease in the interval of sound data to be transmitted in packets, as detected in the detection step.

14. A communication apparatus that performs data communication via a communication network, said apparatus comprising:
   a packet transmitter adapted to transmit image data in packets and to transmit sound data in packets, wherein the sound data is divided into packets of invariable packet size and the image data is divided into packets of variable packet size;
   a detector adapted to detect an amount of sound data to be transmitted in packets; and
   a controller adapted to control the variable packet size of the image data based on the invariable packet size of the sound data, as detected by said detector,
   wherein, when said detector detects the amount of sound data, said controller changes the packet size of the image data to be substantially equal to the packet size of the sound data, and wherein, when said detector does not detect sound data, said controller changes the packet size of the image data to a maximum size.

* * * * *

UNITED STATES PATENT AND TRADEMARK OFFICE
CERTIFICATE OF CORRECTION

PATENT NO.        : 6,947,447 B1                                       Page 1 of 1
APPLICATION NO. : 09/057556
DATED             : September 20, 2005
INVENTOR(S)       : Okamura It is certified that error appears in the above-identified patent and that said Letters Patent is hereby corrected as shown below:

<u>COLUMN 5</u>:
Line 3, "packets divided into are" should read -- divided packets --.

<u>COLUMN 9</u>:
Line 49, "to be." should read -- to be transmitted in packets, as detected by said detector. --.

Signed and Sealed this

Twenty-eighth Day of November, 2006

JON W. DUDAS
*Director of the United States Patent and Trademark Office*